United States Patent [19]

Yu

[11] Patent Number: 4,722,181

[45] Date of Patent: Feb. 2, 1988

[54] GAS GENERATOR WITH INJECTOR MIXING CUP

[75] Inventor: Tai I. Yu, Canoga Park, Calif.

[73] Assignee: Rockwell International Corporation, El Segundo, Calif.

[21] Appl. No.: 376,473

[22] Filed: May 10, 1982

Related U.S. Application Data

[63] Continuation-in-part of Ser. No. 135,571, Mar. 31, 1980, abandoned.

[51] Int. Cl.[4] .............................. F02C 7/26; F02C 1/00
[52] U.S. Cl. ....................................... 60/39.06; 60/737
[58] Field of Search ................. 60/258, 737, 39.06; 239/419, 419.3

[56] References Cited

U.S. PATENT DOCUMENTS

| 2,893,646 | 7/1959 | Batts | 239/419.3 |
|---|---|---|---|
| 3,000,184 | 9/1961 | Fish | 60/258 |
| 3,483,699 | 12/1969 | Harvey | 60/737 |
| 3,603,092 | 9/1971 | Paine | 60/258 |
| 4,080,700 | 3/1978 | Muller | 239/567 |
| 4,255,122 | 3/1981 | Alpkvist et al. | 60/737 |

FOREIGN PATENT DOCUMENTS

1084684 1/1955 France ......................... 239/419.3

OTHER PUBLICATIONS

Sutton, G. P., et al., Rocket Propulsion Elements, John Wiley & Sons, N.Y., 1976; pp. 286–288.

Primary Examiner—Carlton R. Croyle
Assistant Examiner—T. Thorpe
Attorney, Agent, or Firm—H. Fredrick Hamann; Harry B. Field; Lawrence N. Ginsberg

[57] ABSTRACT

A low temperature gas generator 2 comprising a combustion chamber 4, an injector 6 formed with a plurality of recesses each having at least one oxidizer orifice 16, and at least one fuel orifice 10 and a mixing cup plate formed with a plurality of mixing cups 26 each communicating a respective one of said recesses with said combustion chamber 4 and formed with an aspect ratio greater than about 2.0 and less than about 5.0 and a diameter such that the flow velocity of the fuel-oxidizer mixture passing through said mixing cup 26 is in excess of about 150 feet per second.

9 Claims, 1 Drawing Figure

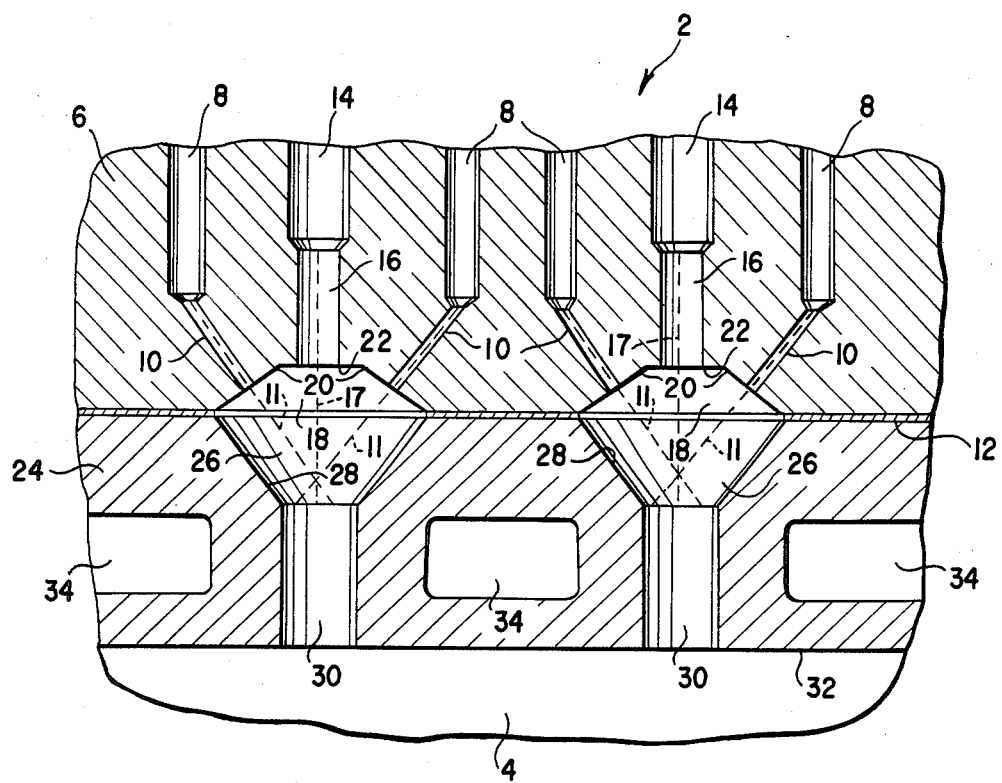

GAS GENERATOR WITH INJECTOR MIXING CUP

The Government has rights in this invention pursuant to Contract No. F33615-76-C-2054 awarded by the U.S. Department of the Air Force.

This application is a continuation-in-part of copending application Ser. No. 135,571, filed Mar. 31, 1980, and abandoned on June 8, 1982.

BACKGROUND OF THE INVENTION

1. Field of the Invention

This invention relates to gas generators and is particularly directed to improved low-temperature gas generators for driving gas turbines and the like.

2. Description of the Prior Art

Gas generators can be divided into two general categories: high-temperature gas generators, such as rocket engines, and low-temperature gas generators, such as are used to drive gas turbines and the like. Each of these categories involves problems which are unique to that category. For example, the thrust developed by rocket engines is proportional to the temperature developed by the gas generator. Consequently, for this category of gas generator, research is constantly being conducted to provide ever higher combustion temperatures and to provide materials and techniques for withstanding these high temperatures. In contrast, gas generators which drive compressors, gas turbines and the like must operate at temperatures below about 1700° F., since temperatures above this would be likely to cause damage to the driven equipment. Unfortunately, in order to hold combustion temperatures below this limit, it is generally necessary to operate the gas generator in a highly fuel-rich condition. Such fuel-rich operation raises problems of incomplete combustion and clogging of injector parts by coking and the like. Accordingly, research for low-temperature gas generators has been aimed at overcoming these problems. However, none of the prior art attempts to solve these problems have been entirely satisfactory.

BRIEF SUMMARY AND OBJECTS OF THE INVENTION

The disadvantages of the prior art are overcome with the present invention and an improved low-temperature gas generator is provided wherein thorough mixing of the fuel and oxidizer is accomplished to promote more efficient and complete combustion, and wherein combustion is prevented from occurring adjacent the injector face so as to protect the injector orifices from clogging due to coking and the like.

The advantages of the present invention are preferably attained by providing mixing cups adjacent the injector orifices communicating with a combustion chamber via a passageway having an aspect ratio (length/diameter) greater than about 2.0 and less than about 5.0, so as to enhance shear-induced mixing of the fuel and oxidizer and align the mixture flow without causing an undesirable amount of liquid film to form on the passageway walls. The diameter of the passageway should be such as to maintain a mixture flow velocity in excess of about 150 feet per second to prevent combustion within the mixing cup so as to preclude coking in the vicinity of the injector face and, thereby, protect the integrity of the injector orifices.

Accordingly, it is an object of the present invention to provide improved gas generators.

Another object of the present invention is to provide low-temperature gas generators having improved mixing of the fuel and oxidizer to provide more efficient and complete combustion.

A further object of the present invention is to provide low-temperature gas generators having means for preventing combustion adjacent the injector face to protect the ingegrity of the injector orifices.

A specific object of the present invention is to provide low-temperature gas generators having mixing cups adjacent the injector orifices communicating with a combustion chamber via a passageway having as aspect ratio greater than about 2.0 but less than about 5.0, and having a diameter such that the flow velocity of the fuel-oxidizer mixture is in excess of about 150 feet per second.

These and other objects and features of the present invention will be apparent from the following detailed description, taken with reference to the FIGURE of the accompanying drawings.

BRIEF DESCRIPTION OF THE DRAWING

The FIGURE is a vertical section through the injector face of a gas generator embodying the present invention.

DETAILED DESCRIPTION OF THE PREFERRED EMBODIMENT

In that form of the present invention chosen for illustration in the drawing, the FIGURE shows a gas generator, indicated generally at 2, having a combustion chamber 4 and an injector 7. The injector 6 comprises a plurality of fuel manifolds 8 which deliver fuel from a suitable source (not shown) to tubular fuel orifices 10 in the injector face 12, together with a plurality of oxidizer manifolds 14 which deliver the oxidizer from a suitable source (not shown) to tubular oxidizer orifices 16 in the injector face 12. Preferably, the fuel will be a liquid such as jet fuel, while the oxidizer will be a gas such as oxygen. Therefore, as shown, the oxidizer manifolds 14 and oxidizer orifices 16 are of substantially greater diameter than the fuel manifolds 8 and fuel orifices 10. However, it should be understood that the fuel could be a gas and the oxidizer could be a liquid or both could be the same, either gas or liquid. The face 12 of the injector 6 is formed with a plurality of frusto-conical recesses 18 which are preferably of trapezoidal cross-section, each cooperating with a respective set of fuel and oxidizer orifices 10 and 16, such that one of the fuel orifices 10 having a substantially linear centerline 11 communicates with a respective one of inclined sides 20 of recess 18, while the oxidizer orifice 16 having a substantially linear centerline 17 essentially coplanar with the centerline 11 of fuel orifice 10 communicates with the inner surface 22 of recess 18. A mixing cup plate 24 is mounted adjacent the face 12 of the injector 6 and is formed with a plurality of mixing cups 26, each connecting a respective one of the recesses 18 with the combustion chamber 4. Each of the mixing cups 26 comprises a generally conical bowl 28 which terminates in a cylindrical passageway 30 which extends to the outer face 32 of the mixing cup plate 24. In use, fuel and oxidizer are injected through respective orifices 10 and 16 along a path approximately parallel to the extended centerlines 11,17 thereof and impinge upon each other at a nonzero angle within the mixing cup 26 to promote mixing of the fuel and oxidizer and atomization of the liquid components thereof. The mixture of fuel and oxidizer flows through passageway 30 into the combustion chamber 4 where it is ignited and burned. The mixing cup plate 24 also contains passageways 34 for the transmission of a coolant fluid from a coolant-fluid supply source (not shown).

The passageway 30 should have an aspect ratio greater than about 2.0 for several reasons. First, the transit time of the fuel/oxidizer mixture therethrough should be sufficiently long to promote shear mixing of the fuel and oxidizer. Second, an aspect ratio greater than about 2.0 serves to align the axial flow of mixture through the passageway so that any gaseous component thereof does not prematurely diverge from the flow of droplets upon discharge from passageway 30 into combustion chamber 4 thereby maintaining mixture integrity. If the aspect ratio of passageway 30 is greater than about 5.0, an undesirable amount of the fuel (and/or oxidizer) droplets will adhere to the interior wall of the passageway. The result of such adherence is an irreversible transformation of the droplets into a liquid film which causes undesirable effects such as variations in the mixture ratio and the incursion of drops too large for proper combustion into combustion chamber 4. The diameter of the passageway 30 is selected to assure that, for a given pressure drop thereacross, the flow velocity of the fuel-oxidizer mixture will be in excess of about 150 feet per second. This prevents combustion from advancing up the stream of fuel and oxidizer to cause premature burning in the mixing cup 26 or passageway 30.

Where the gas generator 2 is being used to drive turbomachinery such as turbines, compressors and the like, it is necessary to keep the flame temperature in combustion chamber 4 below about 1700° F. in order to prevent damage to the turbomachinery. In order to achieve such low-temperature combustion, it is necessary to operate the gas generator 2 in a highly fuel-rich condition. For example, an oxidizer-fuel mixture of about 0.5 is normal for such low-temperature gas generators. Since the pressure drop $\Delta P_1$ between the fuel injection manifold 8 and the mixing cup and the pressure drop $\Delta P_2$ between the oxidizer injection manifold 14 and the mixing cup may be easily regulated, a non-stoichiometric (rich) fuel-oxidizer ratio may be maintained by choosing the proper diameters for fuel orifice 10 and oxidizer orifice 16 while maintaining $\Delta P_1$, and $\Delta P_2$ at a predetermined value. Since the pressure drop across passageway 30 is minimal, such predetermined value should fall within the range of approximately 10% to 15% of the gas generator combustion chamber pressure, measured in combustion chamber 4 to prevent unstable combustion. That is, selecting a fuel orifice 10 having a diameter sufficiently large that the fuel flow therethrough will be sufficient to maintain the desired fuel/oxidizer ratio in the mixing chamber under all operating conditions. Unfortunately, fuel-rich combustion tends to result in incomplete burning and promotes production of particulate solids which tend to cause coking and obstruction of the injector orifices. However, with the passageway 30 being sized as described above, the high velocity flow through the passageway 30 prevents combustion from occurring in the vicinity of the orifices 10 and 16, and hence overcomes this problem.

Numerous variations and modifications may be made without departure from the present invention. Accordingly, it should be clearly understood that the form of the present invention described above and shown in the accompanying drawing is illustrative only and is not intended to limit the scope of the invention.

What is claimed and desired to be secured by Letters Patent of the United States is:

1. A gas generator comprising:
   a combustion chamber;
   a mixing cup and a passageway connecting the cup with said combustion chamber, said passageway being characterized by an aspect ratio greater than about 2.0 but less than about 5.0; and
   an injector comprising a first orifice for delivering fuel to said mixing cup and a second orifice for delivering oxidizer to said mixing cup;
   said first and second orifices having diameters suitable for providing a non-stoichiometric fuel/oxidizer ratio in said mixing cup for given pressure drops across said orifices,
   said first orifice and said second orifices being aligned such that said flow of fuel and said flow of oxidizer impinge at a nonzero angle within said mixing cup, thereby producing an atomized fuel-oxider mixture.

2. A gas generator comprising:
   a combustion chamber;
   a mixing cup and a passageway connecting the cup with said combustion chamber;
   an injector comprising a first orifice for delivering fuel to said mixing cup and a second orifice for delivering oxidizer to said mixing cup;
   said first and second orifices having diameters suitable for providing a non-stoichiometric fuel/oxidizer ratio in said mixing cup for given pressure drops across said orifices; and
   means for causing said fuel/oxidizer mixture to flow through said passageway from said mixing cup to said combustion chamber at a velocity of approximately 150 feet per second or greater,
   said first orifice and said second orifice being aligned such that said flow of fuel and said flow of oxidizer impinge at a nonzero angle within said mixing cup, thereby producing an atomized fuel/oxidizer mixture.

3. A method for generating a gas, comprising:
   delivering a flow of fuel and a flow of oxidizer to a mixing cup through respective fuel and oxidizer orifices in an injector;
   regulating the flow of said fuel and of said oxidizer into said mixing cup so as to maintain a non-stoichiometric ratio therebetween;
   orienting the direction of said flowing fuel and oxidizer so as to cause said flows to intersect at a non zero angle within said mixing cup, thereby producing a mixture of fuel and oxidizer within said mixing cup;
   directing a flow of said fuel/oxidizer mixture, from said mixing cup to a combustion chamber through a passageway having an aspect ratio greater than approximately 2.0 and less than approximately 5.0; and
   maintaining the velocity of said flowing mixture at approximately 150 feet per second or greater.

4. The method of claim 3 wherein said fuel and/or oxidizer is a liquid.

5. The method of claim 4 wherein impingement of said fuel and said oxidizer causes atomization of the liquid components thereof.

6. In an injector for feeding fuel and oxidizer to a combustion chamber, in which injector are formed fuel and oxidizer orifices in individual sets, the improvement comprising:
- a plurality of mixing cup means, each forming a mixing cup within said injector and each coupled to a different set of said fuel and oxidizer orifices, so that fuel and oxidizer flowing through said orifices are mixed within said mixing cup; and
- a plurality of passageway means, each forming a passageway connecting a different one of said mixing cups with said combustion chamber, for feeding fuel and oxidizer from its associated cup to said combustion chamber,
  said passageway having a length-to-diameter aspect ratio greater than 2 and less than 5.

7. The improvement of claim 6, wherein:
said passageway has a diameter sufficient, in consideration of the pressure drop therethrough, to maintain the flow velocity of the fuel and oxidizer mixture flowing into the combustion chamber greater than 150 feet per second.

8. The improvement of claim 6, wherein:
the diameters of said fuel and oxidizer orifices are sufficient to provide a non-stoichiometric fuel/oxidizer ratio in each mixing cup for given pressure drops across said orifices.

9. The improvement of claim 7, wherein:
the diameters of said fuel and oxidizer orifices are sufficient to provide a non-stoichiometric fuel/oxidizer ratio in each mixing cup for given pressure drops across said orifices.

* * * * *